United States Patent

[11] 3,537,483

[72] Inventor Walter Dorwin Teague, Jr.
 Nyack, New York
[21] Appl. No. 674,892
[22] Filed Oct. 12, 1967
[45] Patented Nov. 3, 1970
[73] Assignee Columbia Gas System Service Corporation
 New York, New York
 a corporation of Delaware

[54] RETRACTABLE PIPE PLUG
 10 Claims, 4 Drawing Figs.
[52] U.S. Cl. .................................................. 138/93
[51] Int. Cl. .................................................. F16l 55/12
[50] Field of Search .......................................... 138/89-
 97, 89.1, 89.2, 89.3, 89.4, 90, 91, 92, 93, 94,
 94.3, 94.5, 95, 96, 97; 220/(Inquired)

[56] References Cited
 FOREIGN PATENTS
 201,435 8/1923 Great Britain ................ 138/93

Primary Examiner—Houston S. Bell, Jr.
Attorney—Curtis, Morris and Safford

ABSTRACT: A retractable pipe plug is disclosed for use in sealing an end of a pipeline adapted to be installed in an underwater pipeline system. The plug is retained in place by releasable locking pawls, that engage the pipe end, and an air-pressurized sealing ring that is expanded to engage the inside surface of the pipe. When the pipe is submerged to the installation depth, the pressure in the sealing ring is relieved, a cable extending the length of the pipe and attached to the plug is pulled to release the pawls and the plug is withdrawn through the length of the pipe.

INVENTOR.
Walter Dorwin Teague, Jr.
BY
Curtis, Morris & Safford
ATTORNEYS

RETRACTABLE PIPE PLUG

This invention relates to pipe plugs, and more particularly to pipe plugs that are useful in underwater pipeline systems and that may be released and withdrawn through the pipeline from a remote point.

In laying submerged pipelines, e.g., by the method disclosed in co-pending application entitled "Method and System for Laying Pipe Under Water," Ser. No. 699,220, filed Sept. 20, 1967, now U.S. Pat. No. 3,479,831, which is incorporated herein by reference, it is necessary to have a pipe plug in the pipeline to prevent unwanted entry of water into the pipeline as it is being submerged at a controlled rate.

In the above-noted application, a pipeline is installed by laying a series of long-string pipelines each of which is made up at a shore installation and carefully weight-coated to maintain a slight positive buoyancy. The ends are sealed to preclude water entry, and then the long pipeline string is towed out to the installation area. There, one end is allowed to sink at a controlled rate to a predetermined depth and is attached to the free end of the already laid portion of pipeline. The long-string pipeline is then allowed to flood completely at a controlled rate to bring it from the surface to its permanent position on the sea bottom. Once the long-string pipeline has been connected, it is submerged progressively toward its other end until it lies on the sea bottom. Its free end is then the free end of the pipeline, and it is necessary to remove the plug that is still in position at the connected end of the long-string pipeline from the free end of the pipeline. Further, as the pipe sinks the ambient pressure around the plug increases, and it is necessary to have a plug whose sealing effectiveness is kept despite increases in the ambient pressure surrounding the plug.

Accordingly, it is an object of the present invention to provide a pipe plug for a pipeline to seal the line against water entry and which can be released from a remote location.

Another object of the present invention is to provide a pipe plug whose sealing effectiveness is maintained despite increases in the ambient pressure surrounding the pipe plug.

A further object of the present invention is to provide a pipe plug for a pipeline which can be released and withdrawn through the length of the pipe.

A still further object of the present invention is to provide a mechanically simple, practical and effective pipe plug which may be reused for many applications.

These and other objects and advantages of the present invention can best be understood and appreciated by reference to the accompanying drawings and description.

In accordance with one embodiment of the present invention a hollow resilient member which resembles a tubeless automobile tire, is air-pressurized to expand it against the interior wall surface of the pipe. The center of the tube member is closed by a central impervious plate which has pivoting pawl levers mounted on it which engage the end of the pipe and support the plug rigidly, thus preventing the plug from moving into the pipe. The pawl levers are mounted in a retracting assembly in the plate. A cable extending through the entire length of the long-string pipeline is connected to the retracting assembly, and, when it is desired to remove the plug, the cable is pulled and that causes the assembly to retract the pawl levers by pivoting them away from engagement with the pipe end. The air-pressure within the "tire" or resilient tube also is vented to ambient pressure and the resilient tube contracts away from the pipe wall so that the plug is no longer locked in place in the pipe. The pipe plug is then small enough to move freely along the pipe and may now be withdrawn through the length of the long-string pipeline by means of the attached cable.

Figure 1:
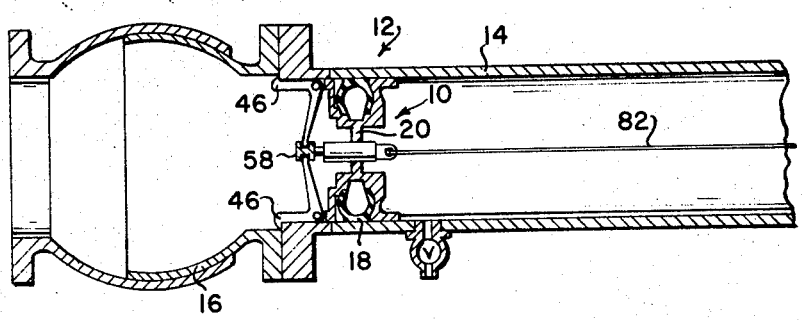
FIG. 1 is a cross section of an end portion of a pipe showing a pipe plug of one embodiment of the invention.

Referring now to FIG. 1, a pipe plug 10 is positioned in an end 12 of a long-string pipeline or pipestring 14. A universal connection 16 is provided on end 12 to connect pipestring 14 with the free end of an already submerged and laid pipeline (not shown). Plug 10 includes (see FIG. 2) an inflatable resilient member or tube 18, which in this embodiment is an automobile tire with a smooth tread portion of the type commonly known as a "slick". Tube 18 is mounted upon a plug assembly 19 having a central circular impervious plate 20. Plate 20 carries integral peripheral flanges 22 and 24 which grip and retain the inner peripheral edges 26 and 28, respectively, of tube 18 when the tube is air-pressurized, in the same manner as an automobile wheel grips and retains a tubeless tire. Flange 22 has a bore 30 in which is mounted a fill valve 32, and a bore 34 in which is mounted a pressure release valve 36.

Flange 22 includes an L-shaped extension 38 which serves as a support for mounting ears 40 spaced around the periphery of extension 38. Pawl levers 42, generally a one piece L-shaped bell crank, are pivotally mounted as at 44 to the mounting ears 40. End 46 of the pawl levers 42 includes a nodular gripping portion 48 which engages a suitable surface 50 on the end of the pipestring 14. The other end 52 of pawl levers 42 includes a generally spherical knob 54 that rides in an annular channel 56 in a retracting assembly 48.

Retracting assembly 58 is slidably mounted within a central boss 60 on plate 20 and includes a shaft 62 slidably disposed within a bore 64 in boss 60. An O-ring 66 positioned around shaft 60 precludes leakage of liquid through bore 64. A retracting block 68 which carries channel 56 in which the ends 54 of the pawl levers are retained, is mounted on the forward end 68 of shaft 62 and is retained against a shoulder portion 72 on shaft 62 by a suitable retaining element such as a nut 74.

Figure 2:
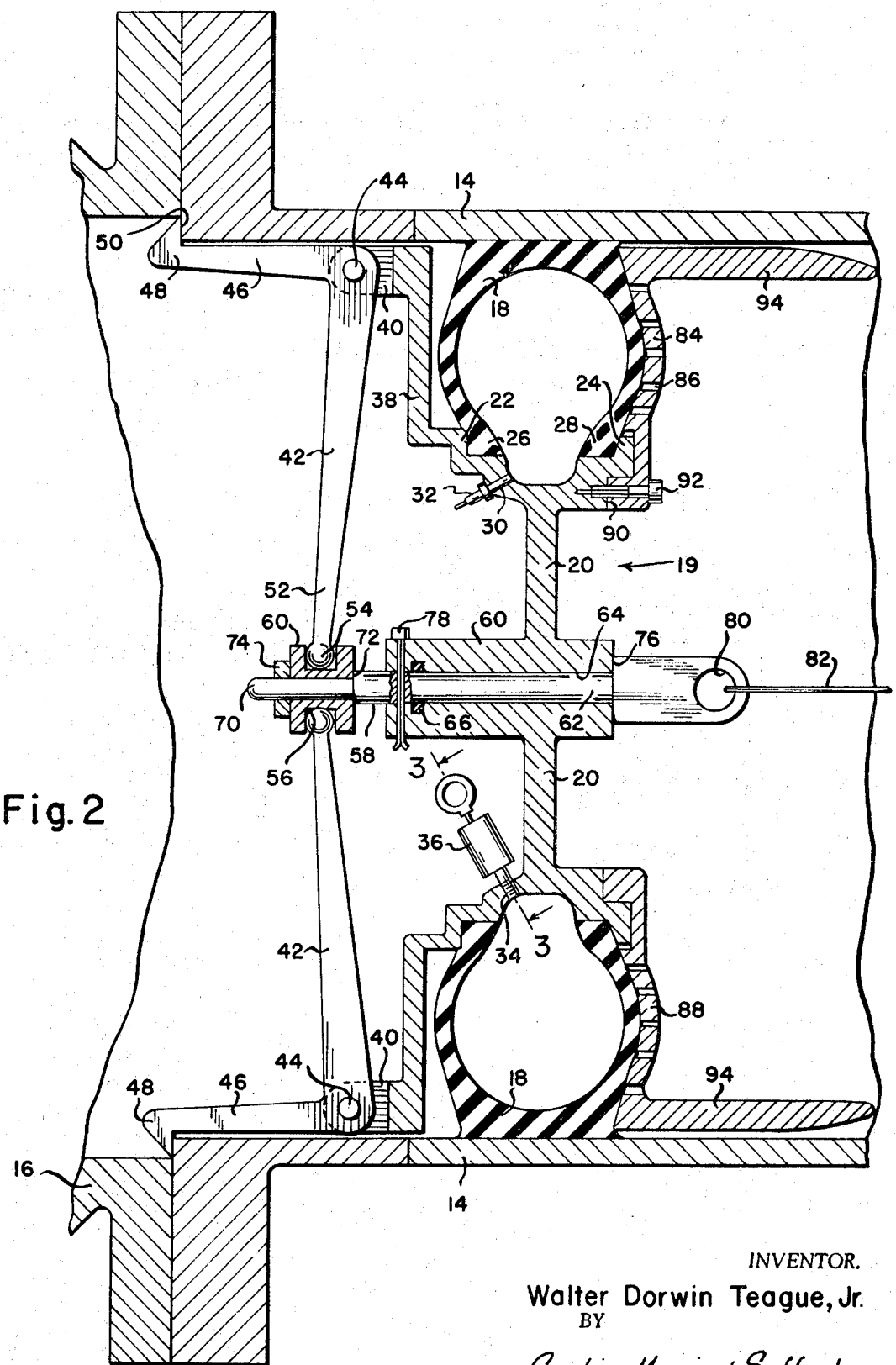
FIG. 2 is an elevational view, partly in section, on an enlarged scale, of the pipe plug of FIG. 1.

When pawl levers 42 are in their retaining position shown in solid line in FIG. 2, shaft 62 is restrained from outward movement by a shoulder 76 that rests against the rear portion of boss 60. A shear pin 78 extending through boss 60 and shaft 62 precludes any movement of shaft 62. An eye 80 on the rear of shaft 62 provides an attachment point for releasing cable 82 which extends the length of the pipestring 14.

A ring shaped pressure plate 84, having perforations 86 in its surface and contoured as at 88 to fit closely behind tube 18, provides a support for the interior surface of pipe plug 10 and is mounted on a flange 90 on central plate 20 by bolts 92. Pressure plate 84 includes a lateral, cylindrical extension 94 which has a sliding fit with pipestring 14. The extension provides for a positive orientation of the pipe plug 10 within the pipestring 14 and prevents the pipe plug from tilting or cocking to one side as it is being withdrawn through the pipestring 14.

Figure 3:
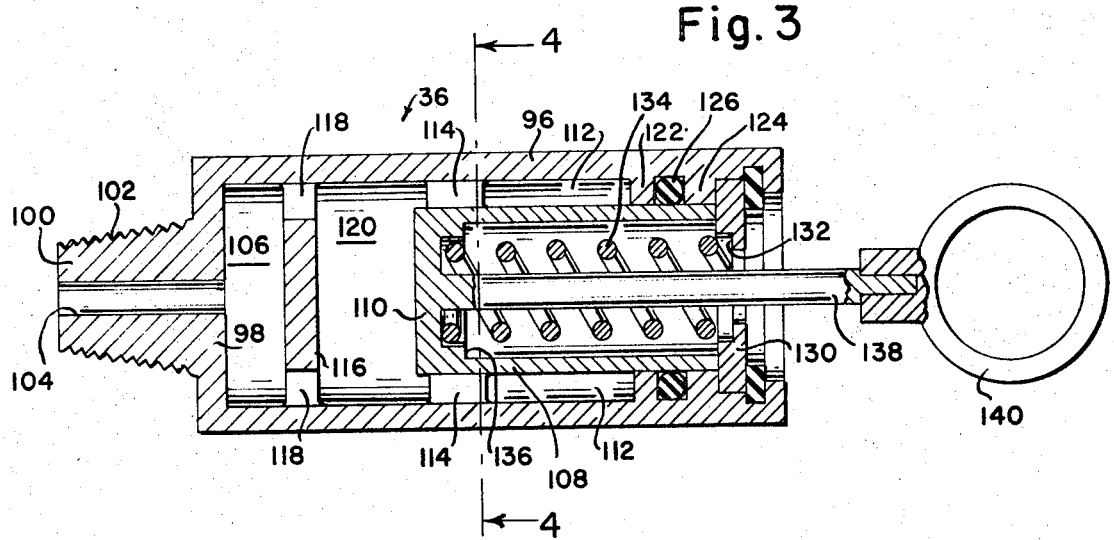
FIG. 3 is a sectional view on line 3–3 of FIG. 2 showing the pressure release valve; and, FIG. 4 is a sectional view on line 4–4 of FIG. 3.
Figure 4:
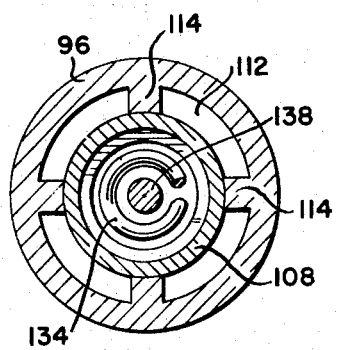

Pressure release valve 36 (FIGS. 3 and 4) includes a generally cylindrical housing 96, a bottom wall portion 98 and a cylindrical extension 100 which has external threads 102 to engage internal threads in the receiving bore 34. A fluid communication passage 104 through extension 100 allows communication between a chamber 106 in cylindrical housing 96 and tube 18. A cylindrical piston 108 having a closed end 110 is slidably disposed within the housing 96 and is spaced from the wall of housing 96 to provide fluid communication passages 112. Circumferentially spaced lugs 114 provide a support for the piston 108 as it moves within the housing 96. A piston stop plate 116 limits movement of piston 108 and includes fluid communication passages 118 spaced around stop plate 116 to allow fluid communication between chamber 106 and a central chamber 120. Spaced flanges 122 and 124 form an indentation 126 to house a seal 128 which prevents fluid communication between the exterior and the interior of tube 18 when piston 108 is fully extended, as in the position shown in FIG. 3. A retaining ring 130 prevents the withdrawal of piston 108 from the housing 96 and includes a shoulder portion 132 to provide a seat for one end of a compression spring 134. The other end of spring 134 is confined by a shoulder 136 on wall 110 and bears against wall 110 and thus urges piston 108 to move into housing 96 toward piston stop plate 116. Piston plunger shaft 138 extending from wall 110 is positioned along the central axis of spring 134 and extends beyond housing 96. Plunger shaft 138 is provided with a grip ring 140 which can be manually held to maintain the piston in the fluid sealing position while the tube 18 is being pressurized. Once the tube pressure exceeds the combined effects of the outside ambient pressure and the spring, the ring may be released as the piston will remain in the sealing position due to the higher tube pressure acting on piston end wall 110.

In operation the pipe plug is placed in an end 12 of pipestring 14 with pawl levers 36 in engagement with the end face 50 of the pipestring and the ends 52 of the pawl levers riding in the retracting assembly 58. Shear pin 78 is then inserted so that the pawl levers cannot pivot out of engagement with the pipestring. Tube 18 is air-pressurized through the fill valve 32 to a nominal pressure, for example 15 p.s.i. while release valve 36 is held closed. The pressure to open release valve 36 is dependent upon the piston area and the spring constant of spring 134 and these are selected so that the valve will remain closed whenever the pressure in the tube exceeds the ambient pressure outside the tube by a nominal valve, for example 5 p.s.i. Thus, while the tube is being pressurized the grip ring is manually held until the 5 p.s.i. differential is reached. From this point on, the valve remains closed while the tire is pressurized to 15 p.s.i. The plug, now in place, effectively seals the pipestring to preclude entry of water into the string. The pipestring may now be towed in the water out to the desired installation area, and in the manner disclosed in the above-noted copending application, the string is allowed to flood at a controlled rate so that it sinks to the installation depth.

As the pipestring 14 sinks in the water, there are three pressures that act on the pipe plug. The first is the pressure to the right of the pipe plug, as viewed in FIG. 2, which is the internal pressure of the pipestring and is essentially the pressure at sea level. The second is the pressure within the tube, which is illustratively 15 p.s.i., and the third is the ambient sea pressure outside of the pipestring which steadily increases as the pipestring sinks in the water. When the difference in pressure between the tube pressure and the ambient pressure reaches 5 p.s.i., the pressure release valve opens to allow sea water to enter the tube 18 through passages 112, chambers 120 and 106 and passage 104. As the pipestring continues to sink the tube pressure, due to the open release valve, now becomes equal to the ambient sea pressure. As the pipe sinks further, this pressure increases and hence, the tube pressure also increases and thus the tube is maintained expanded against the wall of the pipestring. The pressure behind the plug, within the pipestring, rises more slowly from sea level pressure and does not reach ambient sea pressure until the pipe is fully flooded. The engaged pawl levers prevent movement of the plug into the pipestring. When the pipestring has been completely flooded, and the end 12 joined to the free end of a previously laid pipeline, the plug 10 is removed. At this point all three pressures are essentially ambient sea pressure and thus the tube 18, since it is of the type that assumes a smaller diameter when there is no pressure differential across it, is no longer rigidly expanded against the wall of the pipe. The cable 82 is now pulled from the remote end shearing the shear pin 78 and withdrawing the retracting assembly 58 to cause pawl levers 42 to pivot free from engagement with face 50 of the pipestring. The plug, now completely free, is extracted through the length of the pipestring 14 by cable 82. The perforations 86 in pressure plate 84 allow the water in the flooded pipe to pass through the plug as the plug is pulled through the length of the pipe.

It is thus seen that a mechanically simple and effective pipe plug is provided that effectively seals the end of a pipe. The plug can be released from a remote location and retrieved to be used for a number of operations.

An additional advantage of the retractable pipe plug of the present invention is that if slight leakage across the plug occurs, the plug will not malfunction and will still maintain a substantially effective seal. Any slight leakage that may occur will not seriously affect the pipe laying operation as the sealed end of the pipe is being flooded anyway.

I claim:
1. A retractable plug for sealing the end of a pipelike member comprising:
   expansible sealing means adapted to engage the interior wall of said pipelike member;
   retaining means adapted to releasably engage an end of said pipelike member;
   means operably interconnecting said retaining means and said expansible sealing means;
   means to actuate said retaining means to release said retaining means from engagement with said end; and
   means associated with said expansible sealing means to release said expansible sealing means from sealing engagement with said pipelike member, whereby the release of said retaining means and said sealing means permits said plug to be withdrawn from said pipelike member.

2. The retractable plug of claim 1 wherein said expansible sealing means comprises a hollow tube member adapted to be pressurized to expand against the interior wall of said pipelike member;
   an impervious circular plate member to retain and grip the interior portion of said tube and adapted to block fluid flow through the central portion of said plug;
   a fill valve communicating with the interior of said tube to allow said tube to be pressurized; and
   a pressure release valve communicating with the interior of said tube responsive to ambient fluid pressure around said plug to allow said plug to vent to ambient fluid pressure after the ambient fluid pressure exceeds a predetermined value to thereby cause said tube to be released from sealing engagement with said pipelike member.

3. The retractable plug of claim 2 wherein said retaining means to releasably engage an end of said pipelike member includes at least one pawl lever pivotally mounted on said plug and adapted to pivot from a first position where one end of said lever is in engagement with an end of said pipelike member wherein said lever prevents movement of said plug into said pipelike member to a second position where said end of said lever is free from engagement with said end of said pipelike member, and actuating means on said plug operable from a point remote from said plug to cause said lever to pivot from said first position to said second position to thereby allow said plug to be withdrawn from said pipelike member.

4. A pipe plug for sealing the end of a pipestring to be installed as part of a submerged pipeline system, said pipestring adapted to be floated to the installation area and then submerged by flooding at a controlled rate, said plug comprising:
   an expansible tubular member adapted to be pressurized to a preselected pressure to sealingly engage the interior wall of said pipestring near one end thereof;
   a center plate to retain and hold the inner portion of said tubular member said plate being impervious to fluid flow to thereby provide the central portion of said pipe plug;
   a pressure responsive release valve communicating with the interior of said tubular member responsive to the ambient fluid pressure surrounding the exposed portion of said plug and said pipestring; and
   said pressure release valve being designed to open when said ambient pressure exceeds a predetermined value to allow ambient fluid surrounding said plug and pipestring to enter said tubular member and maintain said tubular member in its expanded state in sealing engagement with the wall of said pipestring whereby said plug will remain in effective sealing engagement with said pipestring until said pipestring has been completely flooded and submerged and the pressure within said pipestring equals the ambient fluid pressure surrounding said pipestring.

5. The pipe plug of claim 4 including retaining means adapted to releasably engage said end of said pipestring; said retaining means adapted to be actuated from a point remote from said end of said pipestring to move from a first position limiting movement of said plug into said pipestring to a second position allowing movement of said plug into said pipestring.

6. The pipe plug of claim 5 wherein said retaining means includes at least one substantially L-shaped pawl lever;

said lever being pivotally mounted at its elbow to said center plate;

a first end of said lever having means to engage said end of said pipestring;

the other end of said lever being positioned within a retracting element; and said retracting element includes means operable from a remote point to cause it to move relative to said plug whereby said movement causes said pawl lever to pivot about its elbow from a first position in engagement with said pipestring limiting movement of said plug to a second position allowing movement of said plug.

7. The pipe plug of claim 4 wherein said pressure release valve includes a substantially cylindrical housing open at one end to ambient fluid pressure;

the other end of said housing having a passage therein communicating with the interior of said tubular member;

a piston element slidably disposed within said cylindrical housing and movable from a first position adjacent said one end to a second position adjacent said other end;

said piston element being spaced from the wall of said housing to form a fluid communication passage between said one end and said other end;

sealing means adjacent said one end such that when said piston element is adjacent said one end said fluid communication passage is effectively sealed; and resilient means in said housing urging said piston element to move from said first position to said second position, whereby when said ambient fluid pressure exceeds the predetermined pressure said piston element is urged to move to said second position allowing said ambient fluid pressure to communicate through said housing with the interior of said tubular member.

8. In a structure having a wall which defines an opening, a retractable plug adapted to provide a fluid seal for said opening comprising:

a hollow tube member adapted to be fluid pressurized thereby to expand against the interior surface of said wall within said opening to provide a seal between said tube member and said surface;

a central plate member to retain and grip the inner portion of said tube member and adapted to block fluid flow through the central portion of said plug;

retaining means adapted to releasably clamp a first side of said structure at the periphery of said opening;

means operably interconnecting said retaining means and said tube member;

means to actuate said retaining means to release said retaining means from engagement with said structure; and, means associated with said expansible tube member to release said tube member from sealing engagement with said surface whereby the release of said retaining means and said tube member permits said plug to be withdrawn from said opening.

9. The apparatus of claim 8 wherein ambient fluid pressure on said first side of said structure exceeds ambient fluid pressure on the other side of said structure;

said tube member is fluid pressurized to a pressure initially exceeding the ambient fluid pressure on said other side of said structure;

said means associated with said expansible tube member to release said tube member from sealing engagement with said surface includes a pressure-responsive release valve communicating with the interior of said tube member and the ambient fluid pressure on said first side of said structure, wherein when said ambient fluid pressure on said first side exceeds a predetermined value said pressure-responsive release valve opens to admit ambient fluid from said first side into said tube thereby to cause the tube pressure and the ambient fluid pressure on said first side to equalize.

10. The apparatus of claim 9 wherein said means associated with said expansible tube member to release said tube member from sealing engagement with said surface includes means in said structure to allow pressure equalization between the ambient fluid pressure on said first side and said other side of said structure, whereby the equalization of pressure on said first side, said other side, and within said tube member permits said tube member to contract from its expanded sealing engagement with said surface to allow said plug to be withdrawn from said structure.